United States Patent
Nesbitt

(10) Patent No.: US 7,638,187 B2
(45) Date of Patent: *Dec. 29, 2009

(54) BENEFICIATED FIBER AND COMPOSITE

(75) Inventor: Jeffrey E. Nesbitt, Lititz, PA (US)

(73) Assignee: Americhem, Inc., Cuyahoga Falls, OH (US)

( * ) Notice: Subject to any disclaimer, the term of this patent is extended or adjusted under 35 U.S.C. 154(b) by 46 days.

This patent is subject to a terminal disclaimer.

(21) Appl. No.: 11/617,207

(22) Filed: Dec. 28, 2006

(65) Prior Publication Data

US 2007/0104936 A1    May 10, 2007

Related U.S. Application Data

(62) Division of application No. 10/684,117, filed on Oct. 10, 2003, now Pat. No. 7,175,907.

(51) Int. Cl.
*D04H 1/00* (2006.01)
*B32B 9/00* (2006.01)
*B32B 23/00* (2006.01)

(52) U.S. Cl. .................... 428/292.1; 428/372; 428/375; 428/393; 428/394; 428/396

(58) Field of Classification Search .................. 428/372, 428/375, 392, 393, 394, 396, 292.1; 370/328
See application file for complete search history.

(56) References Cited

U.S. PATENT DOCUMENTS

| | | | |
|---|---|---|---|
| 3,943,079 A | 3/1976 | Hamed | |
| 4,369,201 A | 1/1983 | Kober | |
| 4,372,002 A | 2/1983 | Small | |
| 4,376,144 A | 3/1983 | Goettler | |
| 4,400,217 A | 8/1983 | Kober | |
| 4,414,267 A | 11/1983 | Coran et al. | |
| 4,478,601 A | 10/1984 | Stephens | |
| 4,659,754 A | 4/1987 | Edwards et al. | |
| 5,232,779 A | 8/1993 | Spehner | |
| 5,406,768 A | 4/1995 | Giuseppe et al. | |

(Continued)

FOREIGN PATENT DOCUMENTS

DE    4107617 A1    9/1992

(Continued)

OTHER PUBLICATIONS http://www.olywa.net/when/sect03.html Dec. 17, 2001 "A Review of Building Materials From BAST Plants" Research #3, 1 page.

(Continued)

*Primary Examiner*—D. Lawrence Tarazano
*Assistant Examiner*—Camie S Thompson
(74) *Attorney, Agent, or Firm*—Barley Snyder LLC

(57) ABSTRACT

A beneficiated fiber and composite including a fiber having a lumen with voids. A suspension including a bonding agent, chemical blowing agent, and catalyst is drawn into the lumen by a capillary action to beneficiate the fiber. The beneficiated fiber may be imbedded with a polymeric material to form the composite. The natural voids of the lumen are preserved by the suspension causing the fiber to maintain natural density and strength characteristics.

53 Claims, 2 Drawing Sheets

U.S. PATENT DOCUMENTS

| | | | |
|---|---|---|---|
| 5,494,748 | A | 2/1996 | Spehner |
| 5,695,874 | A | 12/1997 | Deaner et al. |
| 5,705,536 | A | 1/1998 | Tomka |
| 6,011,091 | A | 1/2000 | Zehner |
| 6,103,791 | A | 8/2000 | Zehner |
| 6,122,877 | A | 9/2000 | Hendrickson et al. |
| 6,207,729 | B1 | 3/2001 | Medoff et al. |
| 6,248,813 | B1 | 6/2001 | Zehner |
| 6,344,268 | B1 | 2/2002 | Stucky et al. |
| 6,344,504 | B1 | 2/2002 | Zehner et al. |
| 6,766,817 | B2 | 7/2004 | da Silva |
| 7,175,907 | B2 * | 2/2007 | Nesbitt ........................ 428/375 |
| 2002/0018907 | A1 | 2/2002 | Zehner |

FOREIGN PATENT DOCUMENTS

| | | | |
|---|---|---|---|
| GB | 2090849 A | | 12/1981 |
| WO | WO 95/01869 | * | 1/1995 |

OTHER PUBLICATIONS http://www.olywa.net/when/sect04.html Dec. 17, 2001 "A Review of Building Materials From BAST Plants" Research #4, 2 pages.

http://www.olywa.net/when/sect05.html Dec. 17, 2001 "A Review of Building Materials From BAST Plants" Research #5, 2 pages.

http://www.olywa.net/when/sect07.html Dec. 17, 2001 "A Review of Building Materials From BAST Plants" Research #7, 2 pages.

http://www.olywa.net/when/sect12.html Dec. 17, 2001 "A Review of Building Materials From BAST Plants" Research #12, 1 page.

http://www.olywa.net/when/sect12.html Dec. 17, 2001 "A Review of Building Materials From BAST Plants" Research #14, 1 page.

http://www.olywa.net/when/sect15.html Dec. 17, 2001 "A Review of Building Materials From BAST Plants" Research #15, 1 page.

http://www.olywa.net/when/sect16.html Dec. 17, 2001 "A Review of Building Materials From BAST Plants" Research #16, 2 pages.

http://www.hempology.org/ Aug. 7, 2002 "BAST Fiber Applications Composites" Authored by: Erwin Lloyd & David Seber, 23 pages.

http://www.aps.org/BAPSMAR98/vpr/laym11-3.html; Jan. 3, 2002 "In-Situ Visualization of Polymer Blend Morphology During Extrusion" Kalman Migler; 2 pages.

http://www.agfibre.com/products.htm; Dec. 17, 2001 "Durafibre-Oilseed Flax Straw Product", 2 pages.

http://www.metla.fi/iufro/iufro95abs/d5pap74.htm; Jan. 19, 2002 "Composites from Wood Combined with Cement, Plastic, Fiberglass and Other Materials": Barbu, M., Troger, F., 1 page.

"New Concepts for the Continuous Mixing of Powder Rubber"; Ali Amash, Martin Bogun and Robert-H. Schuster; International Rubber Conference 2001, pp. 1-10.

"Reinforcement of Engineering Themoplastics with High Purity Wood Cellulose Fibers"; Karl Sears, Rodney Jacobson, Daniel Caulfield, & John Underwood; Mar. 6, 2002, pp. 27-35.

http://home.iitk.ac.in/~karnalkk/MS616.htm; "Processing of High Performance Polymers and Composites"; Jan. 3, 2002, pp. 1-20.

"Plant Fibres in Composite Materials: A Review Of Technical Challenges And Opportunities"; Dr. James Bolton The Burgess-Lane Memorial Lectureship in Forestry, Mar. 5, 1997, pp. 1-12.

* cited by examiner

US 7,638,187 B2

BENEFICIATED FIBER AND COMPOSITE

CROSS-REFERENCE TO RELATED APPLICATIONS

This application is a divisional application of application Ser. No. 10/684,117, filed Oct. 10, 2003, now U.S. Pat. No. 7,175,907, which claims the benefit of the filing date under 35 U.S.C. § 119(a)-(d) of application Ser. No. 10/269,051, filed Oct. 10, 2002, now abandoned.

FIELD OF THE INVENTION

The invention relates to fiber composites and a manufacturing method thereof. More specifically, the invention relates to a beneficiated cellulose fiber for use in a plastic composite and a manufacturing method thereof.

BACKGROUND OF THE INVENTION

In response to the increased cost and diminishing quality and availability of natural wood, composites consisting essentially of plastic and natural fibers are steadily replacing the use of traditional wood in construction and transportation applications. Unlike natural wood that splinters and warps, the composites are weather resistant and relatively maintenance free but still offer the same look and feel as natural wood.

The composites typically comprise a plurality of fibers imbedded in a polymeric material. The polymeric material typically consists of a high or low-density olefin thermoplastic or a vinyl based thermoplastic polymer depending on the desired end-use characteristics of the composite. The fibers may be chosen from a variety of plants depending on the desired characteristics of the fiber, for example, density or strength. The natural variation in the apparent density of the different plant fibers is attributable to the presence of a central void or lumen within the fiber.

The manufacture of the composite typically involves extruding of the polymeric material and the fiber. During the manufacture thereof, an extruder melts the polymeric material and mixes the melted polymeric material with the fiber. As a result of the mixing, the melted polymeric material becomes imbedded with the fiber. A bonding agent may be added to the mixture to aid in achieving an adhesive bond between the fiber and the polymeric material. Many other "additives" may be introduced, such as, stabilizers, antioxidants, UV absorbers, fillers and extenders, pigments, process aids and lubricants, impact modifiers, bactericides and other materials that enhance physical and/or chemical properties as well as processing. A chemical blowing agent or gas may also be introduced into the mixture. While in the extruder, the blowing agent decomposes, disbursing a gas, such as, nitrogen or carbon dioxide, into the melted polymeric material. After the polymeric material, fiber and other additives are mixed, the melted mixture exits the extruder through a die. As the polymeric material exits the die, the extrusion pressure is reduced to atmosphere and the polymeric material begins to cool causing the entrained gases to expand as bubbles within the melted mixture. The bubbles are trapped by the surrounding polymeric material and form voids in the composite. These voids reduce the overall density and weight of the composite.

Often during extrusion, the lumen in the fiber collapses under compressive pressure. When the lumen collapses the natural voids in the fiber are lost causing the natural density of the fiber to increase. Because the density of the fiber is increased, the mass of the composite also increases. This increased density runs counter to the advantages of using fiber, which is mass reduction and stiffness enhancement.

It is therefore desirable to develop a fiber and a method of manufacture thereof wherein the lumen does not compress during extrusion such that the natural voids of the lumen are preserved causing the fiber to maintain natural density and strength characteristics. It is also desirable to reduce the overall composite mass by using a blowing agent to further introduce void volume within the polymeric material.

SUMMARY OF THE INVENTION

The invention relates to a beneficiated fiber and composite. The beneficiated fiber includes a fiber having a lumen with voids. A suspension is drawn into the lumen to beneficiate the fiber. A polymeric material is imbedded with the fiber to form the composite. The natural voids of the lumen are preserved by the suspension ingredients allowing the fiber to maintain natural density and strength characteristics.

The invention further relates to a method for manufacturing a beneficiated fiber. A fiber is mixed with a suspension to form a homogeneous mixture. The suspension is drawn into a lumen of the fiber by capillary action to beneficiate the fiber and the beneficiated fiber is cooled. The beneficiated fiber may then be mixed with a melted polymeric material to form a composite that is extruded to form a composite structural member.

DETAILED DESCRIPTION OF THE INVENTION

Figure 1:
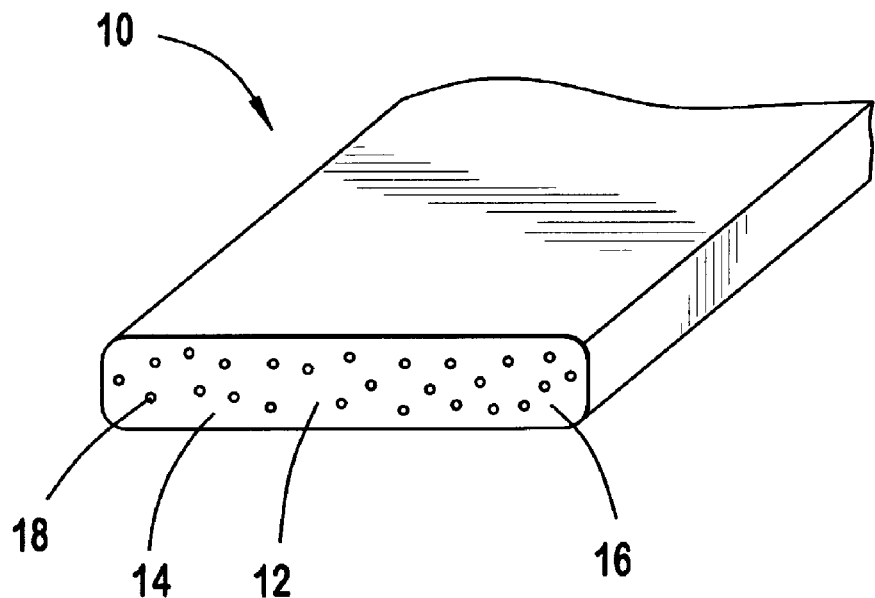
FIG. 1 is a perspective view of a beneficiated fiber composite structural member.

The invention will first be described generally with reference to FIG. 1, which shows a beneficiated fiber composite structural member 10. The composite structural member 10 has a plurality of fibers 12 beneficiated with a suspension 14 and imbedded with a polymeric material 16. The suspension 14 may consist of a chemical blowing agent or foaming agent, a catalyst, and a carrier. The composite structural member 10 also has a plurality of voids 18. The major components of the composite structural member 10, and the method of beneficiating the fiber 12 and manufacturing the composite structural member 10 will hereafter be described.

Figure 2:
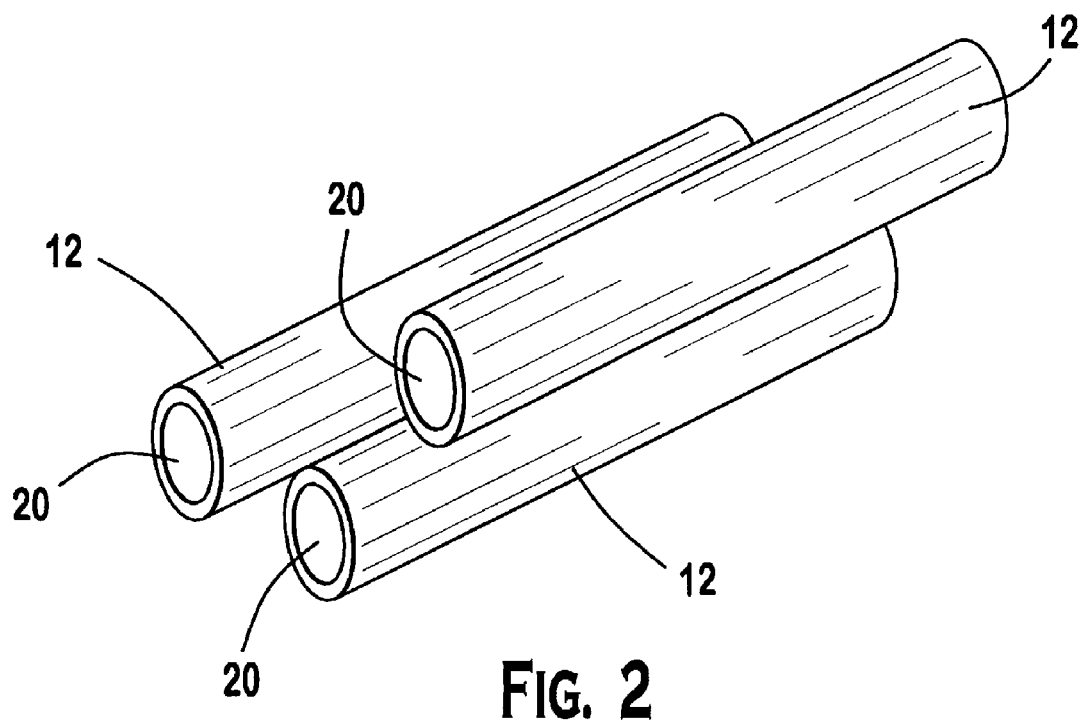
FIG. 2 is a perspective view of a bundle of fibers.

Each of the major components of the composite structural member 10 will now be described in greater detail. FIG. 2 shows the fiber 12. The fiber 12 may be a natural fiber from a bast fiber plant, such as, flax, hemp, jute, coir, kenaf, or ramie, or alternatively may be refined wood, wheat, straw, or other ligno-cellulosic fibers. The bast fiber plants are characterized by their long, strong fiber bundles and high cellulose content. The fibers 12 from the bast fiber plants have a high tensile strength and a relatively low apparent density of 0.28-0.62 g/cc, yielding an especially high strength to weight ratio. Each fiber 12 has a central void or lumen 20. The lumen 20 has an opening of approximately 30 microns. Other fibers having a high purity and a high aspect ratio (ratio of fiber diameter to length) may also be used, such as, refined wood, wheat, straw, or other ligno-cellulosic fibers.

The suspension 14 may include a chemical blowing agent or foaming agent, a catalyst, and a carrier. The individual components are combined and then agitated or emulsified to form a blended mixture. The carrier may be an acrylic urethane polymer solution or emulsion, but other known film-forming polymers may be used to strengthen the internal walls of the fiber. Examples of polymer networks useful to this end result are acrylics, epoxies, phenolics, melamines, vinyls, as well as virtually all film-forming thermoset or thermoplastic polymers. The carriers may be as emulsions with water or as solutions where the blowing agent and/or the catalysts are dispersed therein. The chemical blowing agent or foaming agent may be any of a variety of known chemicals that releases a gas upon thermal decomposition. Exothermic blowing agents are suitable chemical blowing agents. For example, such blowing agents may include a very fine grade of azodicarbonamide or a hydrazine derivative such as benzenesulfonyl hydrazide. The catalyst or activator may be a calcium carbonate. Other examples of particulate catalysts or activators may be selected compounds of cadmium, zinc, barium, calcium, strontium, magnesium, lead, tin or silicon. Any known catalyst or activator may be used that assists in the decomposition of the blowing agent. Because the lumen 20 of the fiber 12 has an approximate opening of 30 microns, particulate ingredients should be no greater than 5 microns. The dispersion of the blowing agent and the other particulates require high velocity dispersators to deagglomerate the particles. Any known dispersator may be used for this process, such as, Cowles and Hockmeyer dispersators.

The polymeric material 16 may be a polyvinyl chloride foam, however, any of a variety of thermoplastic polymers may be used, such as: polyolefins including but not limited to polyethylene, and polypropylene; cellulosics, other vinyls, acrylics, urethanes, styrenics etc. The composite structural member 10 preferably includes about 25-99% of the polymeric material 16.

A coloring agent, such as colored pigments, etc., may also be added to the polymeric material 16 or adsorbed onto an exterior surface of the fiber 12 to obtain a desired color. Stabilizers, antioxidants, fillers and extenders, wetting agents, bonding agents, impact modifiers as well as process aids may also be selectively adsorbed onto the exterior surface of the fiber 12. These additives are generally added to the polymeric material 16 prior to or during extrusion, but adsorbing these additives onto the surface of the fiber 12 prior to extrusion provides an improved vehicle for introduction of these additives into the composite structural member 10. These additives are individually selected to enhance performance and or processing within the polymeric material 16.

A method of beneficiating the fibers 12 and manufacturing the composite structural member 10 will now be described in greater detail with reference to FIG. 3.

Figure 3:
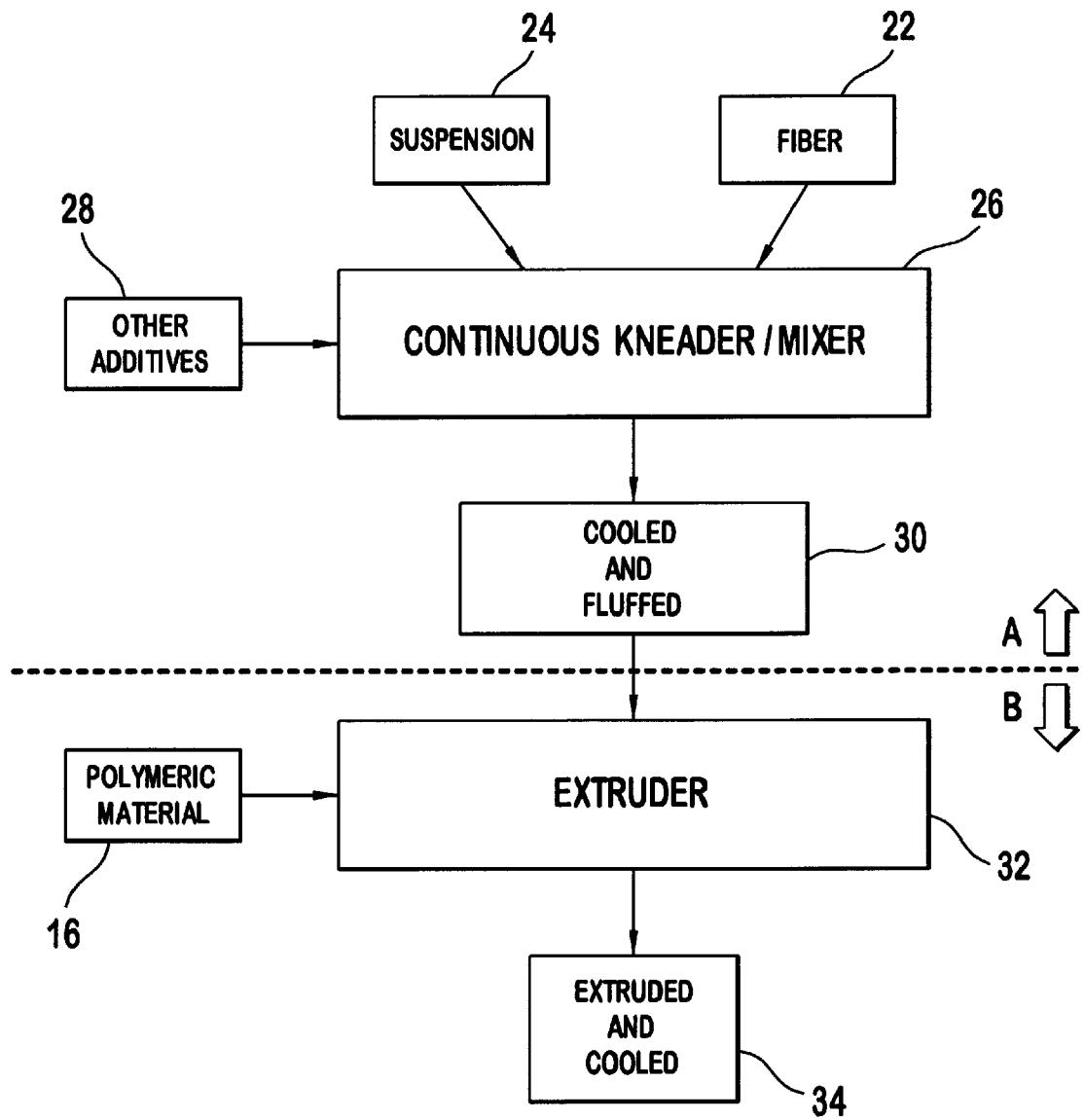
FIG. 3 is a flow diagram showing the process of beneficiating the fibers and manufacturing a beneficiated fiber composite.

The method of beneficiating the fibers 12 is shown in the first portion of the process labeled "A" in FIG. 3. In order to beneficiate the fibers 12, beginning at step 22, the fibers 12 are positioned onto a screw of a continuous kneader/mixer designed to progressively knead and mix dry materials with liquid materials on a continuous basis. The continuous kneader/mixer has a screw and kneading element design that does not cut, but rather only opens bundles of the fiber 12 to ensure the required aspect ratio (ratio of fiber diameter to length). The preferred device is a Readco Continuous Processor, however, it will be appreciated and understood by those skilled in the art that many other single or twin-screw kneader/mixers may be used to achieve substantially similar results.

At step 24, the suspension 14 is positioned in a holding container that feeds the suspension 14 into the kneader/mixer. A metering pump capable of handing viscous liquids and emulsified materials is required. It is important that nothing breaks the emulsion or agglomerates the suspended particles. The suspension 14 is then added to the fibers 12 and kneaded with the fibers 12, as shown at step 26. The suspension 14 may range from approximately 1-10 parts to approximately 100 parts of the fiber 12 to produce a homogeneous mixture. Temperatures in the kneader/mixer during the step 26 range from 200-350 degrees Fahrenheit. Care needs to be taken to assure even kneading and mixing at step 26. As the fiber 12 is kneaded with the suspension 14, capillary action draws the suspension into the lumen 20 of the fiber 12 where it is absorbed by the fiber 12. The suspension 14 thereby beneficiates the fiber 12 and preserves the lumen 20 for later processing in the extruder at step 32.

The adsorption of the other additives that are deposited onto the surface of the fiber 12 takes place after step 26. In step 28, other additives are added as liquid concentrates or dry mixtures to the kneader/mixer. These additives are mixed and dispersed so as to be evenly deposited onto the surface of the fiber 12. Exterior heat of approximately 350-500 degrees Fahrenheit is contained on the barrel of the kneader/mixer so that the additives and the fiber 12 are better mixed and process volatiles are removed. Care should be taken so that the temperature of the additives are maintained at temperature which is below the activation temperature of the selected chemical blowing agent. The beneficiated fiber 12 exits the kneader/mixer and is introduced into a continuous ribbon blender, which cools and fluffs the fiber, as shown at step 30.

The method of manufacturing the composite structural member 10 is shown in the second portion of the process labeled "B" in FIG. 3. The composite structural member 10 is formed by positioning the beneficiated fiber 12 in an extruder at step 32 with the polymeric material 16. The extruder at step 28 melts the polymeric material 16 and mixes the polymeric material 16 with the beneficiated fiber 12. As a result of the mixing, the polymeric material 16 coats the beneficiated fiber 12 and becomes imbedded with the suspension 14. As an alternative to extrusion, the beneficiated fiber 12 and polymeric material 16 may be heated, mixed and injection molded into a mold. The heat used to melt the polymeric material 16 further causes the blowing agent in the lumen 20 to decompose. The blowing agent decomposes at a prescribed temperature governed by the catalyst. As the blowing agent decomposes, the blowing agent disperses a gas, such as, nitrogen or carbon dioxide that forms bubbles in the melted polymeric material 16. Because the lumen 20 of the beneficiated fiber 12 is adequately filled with the ingredients of the suspension 14, the lumen 20 is preserved during extrusion to maintain the natural density of the fiber 12.

The melted mixture of the beneficiated fiber 12 and the polymeric material 16 passes through a die to exit the extruder at step 34 in the form of a sheet or any other extrudable section. As the melted mixture exits the die, the melted mixture begins to cool causing the gas to experience a pressure drop that expands the bubbles trapped by the surrounding polymeric material 16 to form the voids 18. The melted mixture may be extruded in any of a variety of pre-determined shapes as it exits the die or the melted mixture may be molded. As an optional alternative, the extrusion may be thermoformed into a variety of shapes. The cooled melted mixture forms the composite structural member 10.

Because the lumen 20 does not compress during extrusion, the natural voids of the lumen 20 are preserved by the suspension 14 causing the fiber 12 to maintain natural density and strength characteristics. The composite structural member 10, therefore, is lightweight and has exceptional strength. The composite structural member 10 is suitable for use in any of a variety of semi-structural applications including, but not limited to, decking, exterior trim profiles, window profiles, railing, gazebos, cladding, siding, moulding, and door jambs, etc.

It should be understood by those reasonably skilled in the art that the first portion "A" of the manufacturing process in FIG. 3 can be completed at a manufacturer's location while the second portion "B" of the manufacturing process may be completed at a point of service or a customer location where composite structural members 10 are formed. Since the second portion "B" of the process only requires standard extruding equipment, the beneficiated fiber 12 may be screened, classified, and packaged, and then, supplied to the customer after step 30. The customer may then manufacture the composite structural members 10 at its location. Optionally, the entire process including both portions "A" and "B," may be completed at the manufacturer's location according to customer specifications. Where the second portion of the process "B" is conducted at the point of service or customer location, the customer has ultimate flexibility in determining the desired polymeric ratio, color, and shape of the composite structural member 10 among other characteristics.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A composite comprising:
a fiber having a lumen with voids;
a suspension drawn into the lumen to beneficiate the fiber, the suspension including a chemical blowing agent; and
a polymeric material imbedded with the fiber;
whereby the natural voids of the lumen are preserved by the suspension causing the fiber to maintain natural density and strength characteristics.

2. The composite of claim 1 wherein the chemical blowing agent is exothermic.

3. The composite of claim 2 wherein the chemical blowing agent is azodicarbonamide.

4. The composite of claim 2 wherein the chemical blowing agent is a hydrazine derivative.

5. The composite of claim 1 wherein the suspension includes a carrier.

6. The composite of claim 5 wherein the carrier is a polymer network selected from the group of acrylics, epoxies, phenolics, melamines and vinyls.

7. The composite of claim 5 wherein the carrier is a film-forming thermosetting polymer.

8. The composite of claim 1 wherein the suspension includes a catalyst.

9. The composite of claim 8 wherein the catalyst is selected from the group of calcium carbonate, and compounds of cadmium, zinc, barium, calcium, strontium, magnesium, lead, tin or silicon.

10. The composite of claim 1 wherein approximately 1-10 parts of the suspension are mixed with approximately 100 parts of the fiber.

11. The composite of claim 1 wherein the fiber is a bast fiber.

12. The composite of claim 11 wherein the fiber is flax.

13. The composite of claim 11 wherein the fiber is hemp.

14. The composite of claim 11 wherein the fiber is jute.

15. The composite of claim 11 wherein the fiber is coir.

16. The composite of claim 11 wherein the fiber is kenaf.

17. The composite of claim 11 wherein the fiber is ramie.

18. The composite of claim 1 wherein the fiber is a wood fiber.

19. The composite of claim 1 wherein the fiber is a wheat fiber.

20. The composite of claim 1 wherein the fiber is a straw fiber.

21. The composite of claim 1 wherein the fiber is a lignocellulosic fiber.

22. The composite of claim 1 comprising approximately 25% to 99% of the polymeric material.

23. The composite of claim 22 wherein the polymeric material is a polyvinyl chloride foam.

24. The composite of claim 22 wherein the polymeric material is a polyolefin.

25. The composite of claim 24 wherein the polymeric material is polyethylene.

26. The composite of claim 24 wherein the polymeric material is polypropylene.

27. The composite of claim 22 wherein the polymeric material is a cellulosic.

28. The composite of claim 22 wherein the polymeric material is a vinyl.

29. The composite of claim 22 wherein the polymeric material is an acrylic.

30. The composite of claim 22 wherein the polymeric material is a urethane.

31. The composite of claim 22 wherein the polymeric material is a styrenic.

32. The composite of claim 1 further comprising at least one additive that is adsorbed onto a surface of the fiber.

33. The composite of claim 32 wherein the least one additive that is a coloring agent.

34. The composite of claim 32 wherein the least one additive that is a stabilizer.

35. The composite of claim 32 wherein the least one additive that is an antioxidant.

36. The composite of claim 32 wherein the least one additive that is a filler.

37. The composite of claim 32 wherein the least one additive that is an extender.

38. The composite of claim 32 wherein the least one additive that is a wetting agent.

39. The composite of claim 32 wherein the least one additive that is a bonding agent.

40. The composite of claim 32 wherein the least one additive that is an impact modifier.

41. The composite of claim 1 wherein the composite is formed into a composite structural member.

42. The composite of claim 41 wherein the composite structural member is a decking board.

43. The composite of claim 41 wherein the composite structural member is an exterior trim profile.

44. The composite of claim 41 wherein the composite structural member is a railing.

45. The composite of claim 41 wherein the composite structural member is a gazebo component.

46. The composite of claim 41 wherein the composite structural member is a cladding member.

47. The composite of claim 41 wherein the composite structural member is a molding.

48. The composite of claim 41 wherein the composite structural member is a door jamb.

49. The composite of claim 41 wherein the composite structural member is a siding member.

50. The composite of claim 41 wherein the composite structural member is a window profile.

51. The composite of claim 41 wherein the composite structural member is formed by extruding the composite.

52. The composite of claim 51 wherein the composite structural member is further formed by thermoforming.

53. The composite of claim 41 wherein the composite structural member is formed by injection molding.

* * * * *